United States Patent
Sato et al.

(10) Patent No.: US 7,471,410 B2
(45) Date of Patent: Dec. 30, 2008

(54) IMAGE FORMING APPARATUS AND PROGRAM PRODUCT FOR USE IN THE APPARATUS

(75) Inventors: Yuji Sato, Nagoya (JP); Kazuma Aoki, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 979 days.

(21) Appl. No.: 10/661,500

(22) Filed: Sep. 15, 2003

(65) Prior Publication Data

US 2004/0156073 A1    Aug. 12, 2004

(30) Foreign Application Priority Data

Sep. 30, 2002   (JP) ............................. 2002-284862

(51) Int. Cl.
*G06F 15/00* (2006.01)
(52) U.S. Cl. .................... 358/1.15; 709/217; 709/219; 709/229
(58) Field of Classification Search ............... 358/1.15; 709/217, 219, 229
See application file for complete search history.

(56) References Cited

U.S. PATENT DOCUMENTS

| 5,473,441 | A  | * | 12/1995 | Inuiya et al. ................. 386/73 |
| 7,143,141 | B1 | * | 11/2006 | Morgan et al. ............... 709/217 |
| 2002/0024686 | A1 | * | 2/2002 | Uchiyama et al. ............ 358/407 |
| 2003/0053122 | A1 | * | 3/2003 | Kinoshita .................. 358/1.15 |

FOREIGN PATENT DOCUMENTS

JP    2001-236288    8/2001

* cited by examiner

*Primary Examiner*—Mark R. Millia
(74) *Attorney, Agent, or Firm*—Oliff & Berridge, PLC (57) ABSTRACT

An image forming apparatus sends a request signal to a web server upon reception of a request signal for web server from a LAN terminal and receives content data sent from the web server in response to the request signal. The image forming apparatus judges whether the received content data is suitable for a display capabilities of the LAN terminal. When judging that the received content data is suitable for the capabilities of the LAN terminal that has sent the request signal, the image forming apparatus transfers the received content data to the LAN terminal. When judging that the received content data is not suitable for the capabilities of the LAN terminal that has sent the request signal, the image forming apparatus executes a print request process to thereby print an image based on the content data on a recording sheet.

18 Claims, 8 Drawing Sheets

| ADDRESS | SCREEN SIZE | NUMBER OF COLORS | COLOR/ MONOCHROME | EXTRACTABLE FORMAT |
|---|---|---|---|---|
| 192.168.0.5 | 320 x 480 | 8 BITS | COLOR | GIF, JPEG |
| 192.168.0.17 | 240 x 320 | 16 BITS | COLOR | GIF, JPEG, PNG |
| 192.168.0.21 | LIMITLESS | LIMITLESS | LIMITLESS | LIMITLESS |
| 192.168.0.36 | 240 x 160 | 8 BITS | MONOCHROME | GIF |
| ...... | ...... | ...... | ...... | ...... |

FIG. 5B

| TERMINAL TYPE | SCREEN SIZE | NUMBER OF COLORS | COLOR/ MONOCHROME | EXTRACTABLE FORMAT |
|---|---|---|---|---|
| COMPANY A, TYPE XX | 320 x 240 | 16 BITS | COLOR | GIF, JPEG |
| COMPANY A, TYPE OO | 160 x 240 | 16 BITS | MONOCHROME | GIF, JPEG, PNG |
| COMPANY B, TYPE XX | 240 x 320 | 8 BITS | MONOCHROME | GIF |
| ...... | ...... | ...... | ...... | ...... |

IMAGE FORMING APPARATUS AND PROGRAM PRODUCT FOR USE IN THE APPARATUS

BACKGROUND OF THE INVENTION

1. Field of the Invention

The present invention relates to an image forming apparatus that is connectable to a WAN (wide area network) and a LAN (local area network) and capable of conducting a bidirectional communication with each terminal in those networks, and a program product used in the image forming apparatus.

2. Description of the Related Art

A content delivery system is known which sends content data such as image data and audio data stored in a content server in a WAN to a terminal in a LAN via a gateway apparatus (refer to JP-A-2001-236288).

In recent years, home electrical appliances have been networked and considerable variations have come to exist in the capabilities of terminals in a LAN. JP-A-2001-236288 discloses a content delivery system in which capabilities of terminals that receive content data are determined and content data that is suitable for the capabilities is delivered.

More specifically, every time the gateway apparatus disclosed in JP-A-2001-236288 receives a content request from a LAN terminal, the gateway apparatus determines a content server by analyzing the content request and informs the content server of capabilities of the terminal that has transmitted the content request, such as a screen size, the number of pixels, the number of colors, presence/absence of audio, a version of JAVA (registered trademark), and performance.

Upon receiving a notice of capabilities from the gateway apparatus, the content server informs the gateway apparatus of reception of the notice of capabilities by sending an acknowledgment signal (ACK) to the gateway apparatus. In response to the content request sent from the gateway apparatus, the content server selects content data suitable for the capabilities among content data that have been identified based on the content request, and sends the selected content data to the gateway apparatus.

Therefore, the content data that has been sent from the content server and is suitable for the LAN terminal is sent from the gateway apparatus to the terminal.

However, in the conventional content delivery system, content data that are not suitable for terminal capabilities are not sent from the content server and hence a user at the LAN terminal cannot acquire information contained in such content data.

SUMMARY OF THE INVENTION

The present invention has been made to solve the above problems, and therefore an object of the invention is to provide an image forming apparatus that is connectable to a WAN (wide area network) and a LAN (local area network) and capable of conducting a bidirectional communication with each terminal in those networks, the image forming apparatus supplying a user at a LAN terminal with content data that are not suitable for the capabilities of the LAN terminal.

According to one aspect of the invention, there is provided an image forming apparatus connectable to a WAN and a LAN and capable of conducting a bidirectional communication with each terminal in the WAN or the LAN, including: an image forming unit configured to form an image based on externally input data on a recording medium; a substitutional sending/receiving unit configured to send a request signal to a web server in the WAN upon reception of a request signal for web server from a LAN terminal in the LAN, and configured to receive content data sent from the web server as a response signal to the request signal; a transfer unit configured to send the content data received by the substitutional sending/receiving unit to the LAN terminal that has sent the request signal for web server; an image formation requesting unit that causes the image forming unit to form an image based on the content data received by the substitutional sending/receiving unit by inputting the content data to the image forming unit; and a switching unit configured to judge whether the content data received by the substitutional sending/receiving unit is suitable for capabilities of the LAN terminal, configured to cause the transfer unit to operate when judging that the content data is suitable for the capabilities of the LAN terminal, and configured to cause the image formation requesting unit to operate when judging that the content data is not suitable for the capabilities of the LAN terminal.

According to another aspect of the invention, there is provided a program product for causing an image forming apparatus that is connectable to a WAN and a LAN, capable of conducting a bidirectional communication with each terminal in the WAN or the LAN and including an image forming unit configured to form an image based on externally input data on a recording medium to execute procedures, including: a substitutional sending unit that sends a request signal to a web server in the WAN upon reception of a request signal for web server from a LAN terminal in the LAN; a substitutional receiving unit that receives content data sent from the web server as a response signal to the request signal; a transferring unit that transfers the content data received by the substitutional receiving unit to the LAN terminal that has sent the request signal for web server when judging that the content data is suitable for the capabilities of the LAN terminal; and a requesting unit that requests to form an image based on the content data by inputting the content data to the image forming unit when judging that the content data is not suitable for capabilities of the LAN terminal.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Hereinafter, prior to describing a preferred embodiment of the invention, various aspects of the invention will be described.

A first aspect of the invention provides an image forming apparatus that is connectable to a WAN (wide area network) and a LAN (local area network) and capable of conducting a bidirectional communication with each terminal in those networks, including an image forming unit configured to form an image based on externally input data on a recording medium (e.g., a recording sheet), a substitutional sending/receiving unit, a transfer unit, an image formation requesting unit, and a switching unit.

The substitutional sending/receiving unit sends a request signal to a web server in the WAN when receiving, from a LAN terminal, the request signal for web server in the WAN, and receives content data (e.g., an HTML (hypertext markup language)) sent from the web server in the WAN as a response signal to the request signal.

The switching unit judges whether the content data received by the substitutional sending/receiving unit is data that is suitable for capabilities (e.g., display capabilities) of the LAN terminal that has sent the request signal for web server, and causes the transfer unit to operate when judging that the content data is data suitable for the capabilities of the LAN terminal. On the other hand, the switching unit causes the image formation requesting unit to operate when judging that the content data is data not suitable for the capabilities of the LAN terminal.

When its operation is started, the transfer unit sends the content data received by the substitutional sending/receiving unit to the LAN terminal that has sent the request signal for web server.

On the other hand, when its operation is started, the image formation requesting unit causes the image forming unit to form an image based on the content data by inputting the content data received by the substitutional sending/receiving unit to the image forming unit.

In the image forming apparatus, when content data received by the substitutional sending/receiving unit is data suitable for the capabilities of a LAN terminal that has sent the request signal for web server, the content data is sent to the LAN terminal and processing based on the content data is conducted in the LAN terminal. On the other hand, when the content data is data that is not suitable for the capabilities of the LAN terminal, the image forming unit forms an image (e.g., prints an image on a sheet) on the basis of the content data.

Therefore, according to the image forming apparatus, even if content data is data that is not suitable for the capabilities of a LAN terminal, the content data is properly output by image formation and a recording medium on which an image is formed (i.e., a printed medium) can be supplied to the user.

As a result, according to the image forming apparatus of the invention, the user does not feel unsatisfied because the user can handle data that are not suitable for the capabilities of a LAN terminal. This is convenient to the user.

The image formation requesting unit of the image forming apparatus may cause the image forming unit to form an image based on content data without obtaining a permission from the user. However, it is preferable that the image forming apparatus be configured as follows.

The image formation requesting unit of the image forming apparatus according to a second aspect of the invention sends the LAN terminal a message inquiring whether to cause the image forming unit to form an image based on the content data received by the substitutional sending/receiving unit, and inputs the content data received by the substitutional sending/receiving unit to the image forming unit when receiving an image formation instruction signal from the LAN terminal as a response to the message.

In the image forming apparatus according to the second aspect, the image formation requesting unit sends the LAN terminal a message inquiring whether to cause the image forming unit to form an image based on the content data, and whether to cause the image forming unit to form an image is determined on the basis of a response signal. Therefore, the user can arbitrarily cause the image forming unit to form an image based on the content data by manipulating the LAN terminal on the basis of the message sent from the image formation requesting unit.

Therefore, an event can be avoided that the image formation requesting unit automatically causes the image forming unit to form an image of content data that is not suitable for the capabilities of the LAN terminal regardless of the user's intention. This prevents the user from feeling unsatisfied because an image is not formed contrary to his or her intention.

Incidentally, one method by which the switching unit judges whether the content data is data suitable for the capabilities of the LAN terminal that has sent the request signal for web server is as follows. Each LAN terminal is configured to add information relating to the capabilities of the LAN terminal to a request signal. The switching unit judges whether content data is data suitable for the capabilities of the LAN terminal that has sent the request signal for web server on the basis of the information relating to the capabilities of the LAN terminal that is contained in the request signal.

However, with this method, only LAN terminals each of which can add information relating to the capabilities of the LAN terminal to a request signal can utilize the functions of the image forming apparatus. Therefore, it is preferable that the image forming apparatus according to the first or second aspect be provided with a database.

The image forming apparatus according to a third aspect of the invention further includes a database for storing information relating to capabilities of each LAN terminal in the LAN, wherein the switching unit judges whether the content data received by the substitutional sending/receiving unit is suitable for the capabilities of the LAN terminal that has sent the request signal for web server on the basis of the information relating to capabilities of each LAN terminal that is stored in the database.

In the image forming apparatus according to the third aspect, since the information relating to capabilities of each LAN terminal is stored in the database, even if plural types of LAN terminals exist in mixture in the LAN, whether content data is suitable for the capabilities of a LAN terminal can be judged properly by causing the switching unit to refer to the database.

The database may be configured to be updated by manual operation, that is, the user's inputting data. However, in the case of manual updating, every time a new LAN terminal is connected to the LAN, information relating its capabilities needs to be registered in the database by manual operation. This results in that the management of the database becomes complicated. Therefore, it is preferable that the image forming apparatus according to the third aspect be provided with a registering unit.

The image forming apparatus according to a fourth aspect of the invention further includes a registering unit for judging whether information relating to the capabilities of the LAN terminal that has sent the request signal for web server is registered in the database, and for acquiring, when judging that it is not registered in the database, information relating to the capabilities of the LAN terminal from the LAN terminal and registering it in the database.

In the image forming apparatus according to the fourth aspect, the registering unit acquires information relating to the capabilities of the LAN terminal from the LAN terminal and updates the database automatically. Therefore, the user is not obliged to consume time in updating, etc., of the database. This is convenient to the user.

Incidentally, a web server supplies external terminals with various content data such as an HTML document, image data, and musical data. Therefore, where content data that are received from the web server are mot limited to image formable data including an HTML document and image data, there may occur a case that the image forming unit cannot form an image properly for content data that is not suitable for the capabilities of the LAN terminal. That is, when content data is musical data such as a WAV file, the image forming unit can only form an image of information relating to the musical data or information on the acquisition source web server. Thus, information directly representing the content data cannot be supplied to the user.

Therefore, it is preferable that the image forming apparatus according to any one of the first to fourth aspects of the invention be provided with a data writing unit.

The image forming apparatus according to a fifth aspect of the invention further comprises a data writing unit for writing the content data received by the substitutional sending/receiving unit to a recording medium for data storage, wherein the switching unit selectively causes the image formation requesting unit or the data writing unit to operate depending on a type of the content data when judging that the content data is not suitable for the capabilities of the LAN terminal that has sent the request signal for web server.

In the image forming apparatus having the above configuration, content data that is not sent to the LAN terminal can be written to a recording medium for data storage such as a hard disk drive, a flexible disk, or a memory card.

Therefore, in the image forming apparatus according to the fifth aspect, when content data received by the substitutional sending/receiving unit is of such a kind (e.g., musical data for reproduction of music) that the image forming unit cannot form an image properly, the content data can temporarily be stored on the image forming apparatus side by writing the data to the recording medium for data storage. Therefore, according to the image forming apparatus, temporarily stored content data can be processed later by another LAN terminal by taking out the data from the recording medium for data storage.

The invention relating to the image forming apparatus has been described above. On the other hand, the functions of the substitutional sending/receiving unit, the transfer unit, the image formation requesting unit, and the switching unit in the image forming apparatus according to the first or second aspect of the invention can be implemented on a computer that is incorporated in the image forming apparatus.

According to a sixth aspect of the invention, there is provided a program product for implementing on a computer functions of the substitutional sending/receiving unit, the transfer unit, the image formation requesting unit, and the switching unit in the image forming apparatus according to the first or second aspect.

The image forming apparatus according to the first or second aspect can be constructed by causing a computer incorporated in an image forming apparatus connected to a WAN and a LAN, capable of conducting a bidirectional communication with each terminal in those networks and having an image forming unit for forming an image based on externally input data on a recording medium to execute the program product according to the sixth aspect. And the same advantages as provided by the image forming apparatus according to the first or second aspect can be provided.

The image forming apparatus according to the third aspect can be constructed by causing, to execute a program product for implementing on a computer the functions of the substitutional sending/receiving unit, the transfer unit, the image formation requesting unit, and the switching unit in the image forming apparatus according to the third aspect, a computer that is incorporated in an image forming apparatus connected to a WAN and a LAN, capable of conducting a bidirectional communication with each terminal in those networks, and including an image forming unit for forming an image based on externally input data on a recording medium and a database for storing information relating to capabilities of each LAN terminal in the LAN. And the same advantages as provided by the image forming apparatus according to the third aspect can be provided.

The image forming apparatus according to the fourth aspect of the invention can be constructed by causing, to execute a program product for implementing on a computer the functions of the substitutional sending/receiving unit, the transfer unit, the image formation requesting unit, the switching unit, and the registering unit in the image forming apparatus according to the fourth aspect, a computer that is incorporated in an image forming apparatus connected to a WAN and a LAN, capable of conducting a bidirectional communication with each terminal in those networks, and including an image forming unit for forming an image based on externally input data on a recording medium and a database for storing information relating to capabilities of each LAN terminal in the LAN. And the same advantages as provided by the image forming apparatus according to the fourth aspect can be provided.

The image forming apparatus according to the fifth aspect of the invention can be constructed by causing, to execute a program product for implementing on a computer the functions of the substitutional sending/receiving unit, the transfer unit, the image formation requesting unit, the switching unit, and the data writing unit in the image forming apparatus according to the fifth aspect, a computer that is incorporated in an image forming apparatus connected to a WAN and a LAN, capable of conducting a bidirectional communication with each terminal in those networks, and including an image forming unit for forming an image based on externally input data on a recording medium and a recording medium for data storage. And the same advantages as provided by the image forming apparatus according to the fifth aspect can be provided.

Each of the above-described program products can be distributed being stored in a recording medium such as a magnetic disk (e.g., a flexible disk), a magneto-optical disk, or a compact disc.

Figure 1:
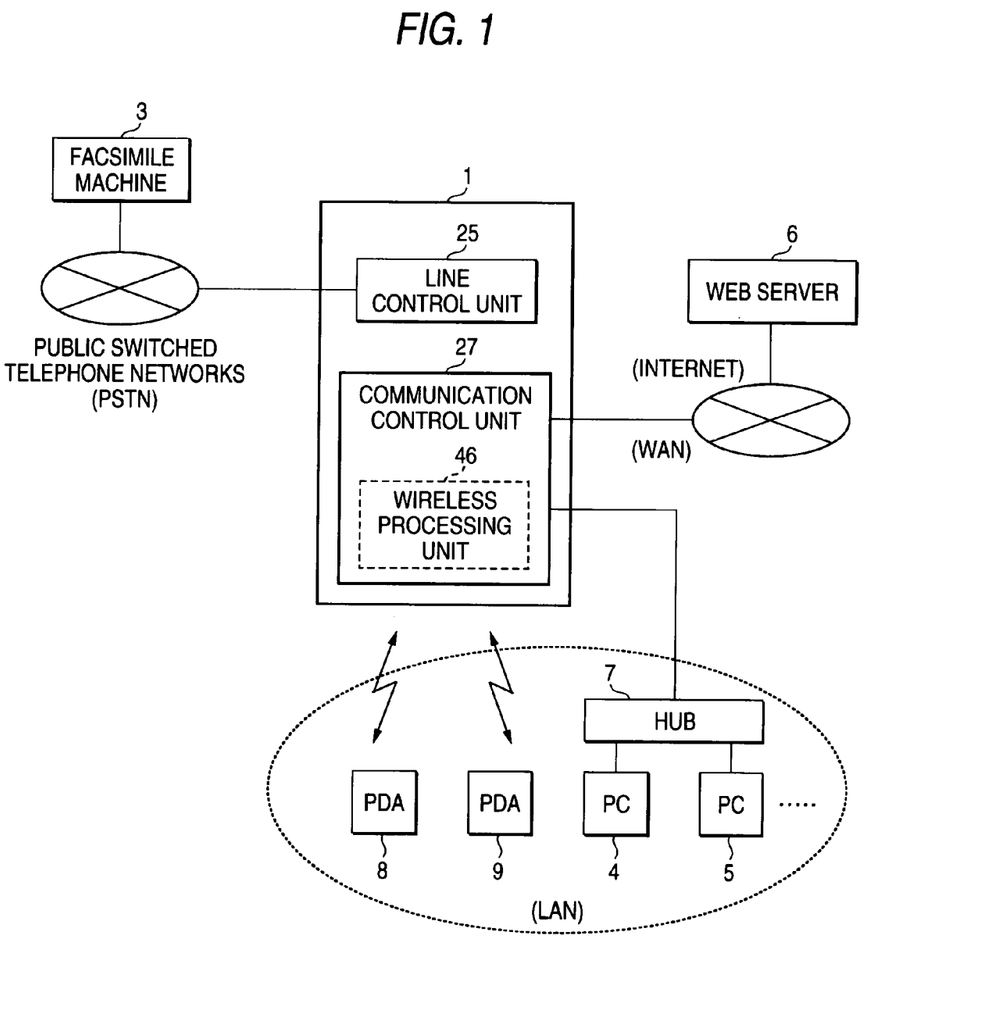
FIG. 1 illustrates a communication system including a digital composite machine according to an embodiment of the invention.
Figure 2:
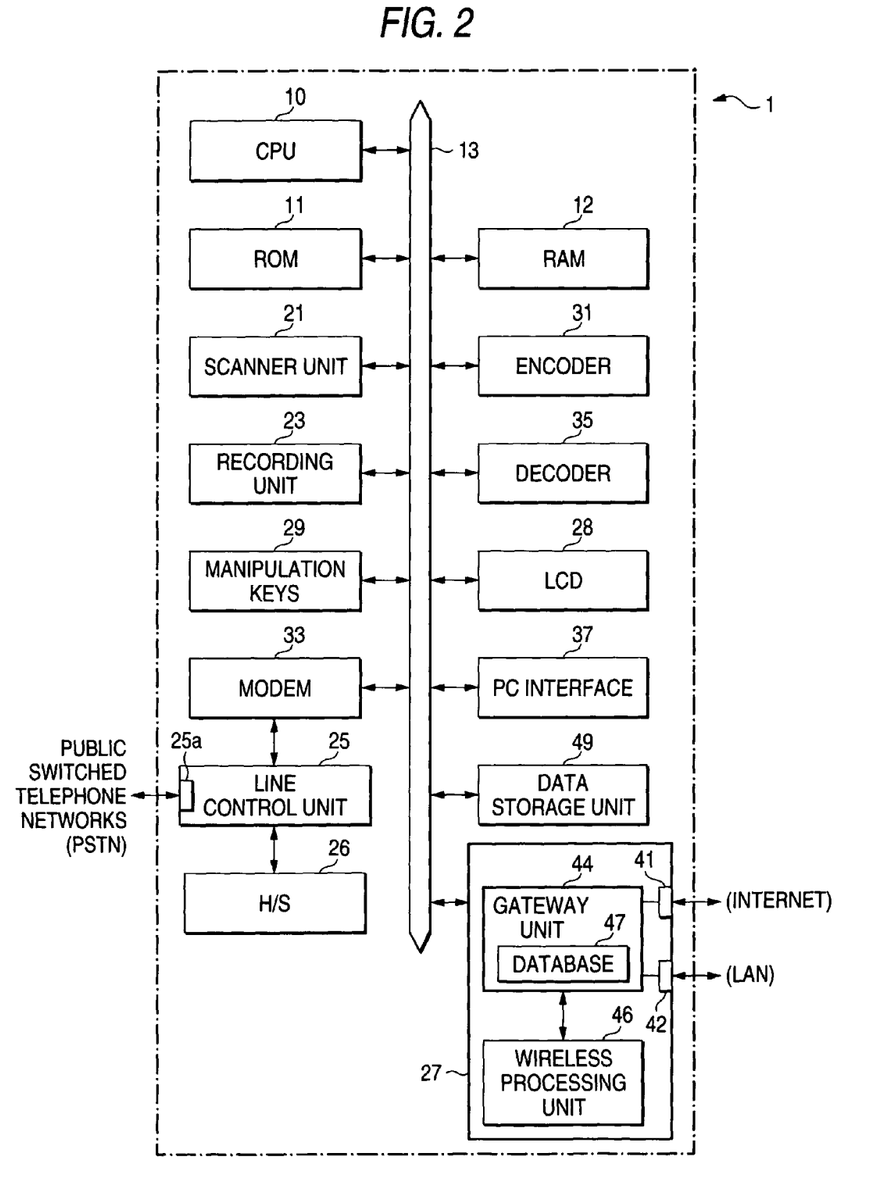
FIG. 2 illustrates a block diagram showing an internal configuration of the digital composite machine.

Referring now to the accompanying drawings, a description will be given in detail of an embodiment of the invention. FIG. 1 illustrates a communication system including a digital composite machine 1 as an image forming apparatus according to an embodiment of the invention. FIG. 2 is a block diagram showing an internal configuration of the digital composite machine 1.

The digital composite machine 1 according to the embodiment is equipped with a CPU 10 for controlling the entire apparatus in a unified manner and a ROM 11 and a RAM 12 for storing and providing programs, data, etc., which are necessary for operation of the CPU 10. The CPU 10 controls via a bus 13 individual units of the apparatus such as a scanner unit 21, a recording unit 23, a line control unit 25, and a communication control unit 27 to thereby realize a facsimile function, a printer function, a copier function, a web print function, etc.

The digital composite machine 1 includes a user interface having a liquid crystal display (LCD) 28, manipulation keys 29, etc. For example, when a facsimile data transmission start instruction signal is input from the manipulation keys 29 by a user's manipulating the manipulation keys 29, the digital composite machine 1 reads an image optically from an original document using the scanner unit 21, converts image data of the image into facsimile data using an encoder 31, and sends the facsimile data to an external facsimile machine 3 that is connected to public switched telephone networks (PSTN) using a modem 33 and the line control unit 25.

When receiving facsimile data that has been transmitted via the public switched telephone networks from the external facsimile machine 3, the digital composite machine 1 converts the facsimile data received by the line control unit 25 into image data for printing by inputting the facsimile data to a decoder 35 via the modem 33 and then forms an image based on the facsimile data on a recording sheet using the recording unit 23 (facsimile function).

When a copy start instruction signal is input from the manipulation keys 29, the digital composite machine 1 reads an image from an original document using the scanner unit 21, inputs resulting image data to the recording unit 23, and causes the recording unit 23 to form an image based on the image data on a recording sheet (copier function).

The line control unit 25 has a connection port 25a, to which an analog line (called "telephone line" (two cores or four cores)) is connected. The analog line is connected to part of the public switched telephone networks which is wired in a building. The line control unit 25 conducts operations such as sending of a dialing signal to the public switched telephone networks and responding to a call signal from the public switched telephone networks. The line control unit 25 accesses, via the analog line, an external communication terminal (facsimile machine 3) connected to the public switched telephone networks and sends or receives facsimile data.

The modem 33 that is connected to the line control unit 25 is a signal conversion device, and converts facsimile data into a communication signal suitable for sending to the public switched telephone networks or converts a reception signal from the public switched telephone networks, to thereby extract facsimile data. A handset (H/S) 26 is connected to the line control unit 25, and the digital composite machine 1 functions as a telephone terminal capable of sending and receiving a voice of a user or a person at the other end of the line.

The scanner unit 21 reads the contents of an original document at the time of sending of facsimile data, copying (of the original document), or the like. The scanner unit 21 of this embodiment receives an original document on which an image of a text, a picture, etc., are formed from a document feed tray (not shown) of the digital composite machine 1. The scanner unit 21 reads the image optically from the original document, produces image data as a reading result, and inputs the image data to the encoder 31.

The encoder 31 converts image data representing an image that has been read by the scanner unit 21 into image data of the G3 compression format that is a facsimile format. When receiving image data from the scanner unit 21, the encoder 31 produces image data of the G3 compression format by conducting coding processing. The image data of this facsimile format is input to the modem 33.

The decoder 35 produces image data for printing that can be processed by the recording unit 23 by decoding facsimile format image data that has been input externally. Facsimile format image data that has been received by the line control unit 25 is input to the decoder 35. The image data for printing which has been produced by decoding through the decoder 35 is input to the recording unit 23.

The recording unit 23 functions as an image forming unit capable of forming a color image on a recording sheet. When image data is input externally, the recording unit 23 of this embodiment prints a color image based on the image data on a recording sheet and outputs the printed recording sheet (i.e., printed medium).

The digital composite machine 1 according to the embodiment has the printer function. For example, when image data for printing is received from an external personal computer (PC) via a PC interface (PC I/F) 37 or from a PC 4 or 5, etc., in a LAN via the communication control unit 27, the image data is input to the recording unit 23, which forms an image based on the image data for printing on a recording sheet.

Figure 3:
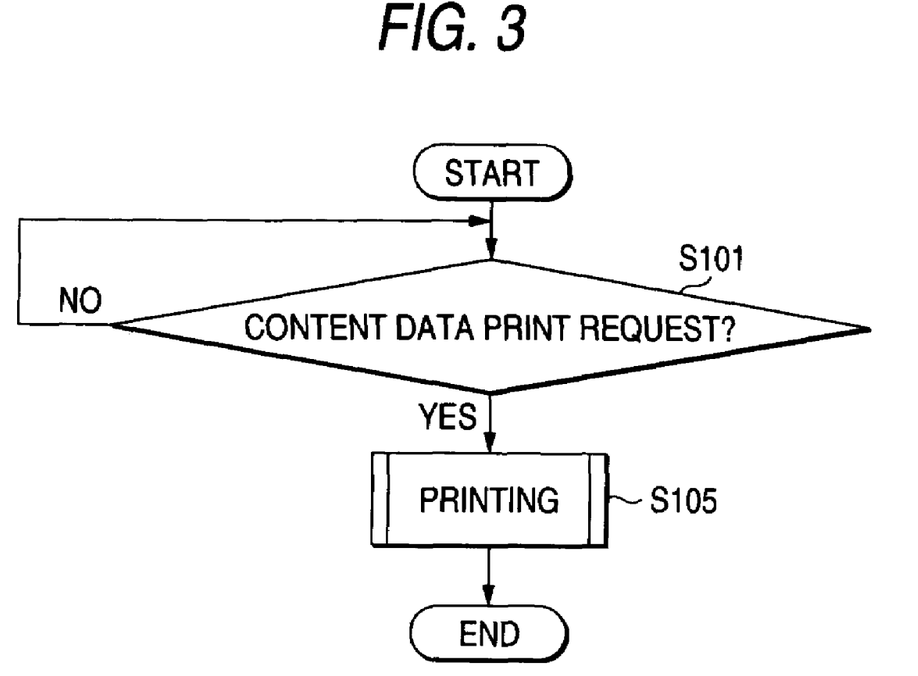
FIG. 3 shows a flowchart of a web print process that is executed by a CPU.

The digital composite machine 1 according to the embodiment also has the web print function. When receiving, via the communication control unit 27, a print request signal that requests printing of content data (an HTML document or the like) of a web server 6 (S101), the CPU 10 of the digital composite machine 1 causes the recording unit 23 to form an image based on the content data on a recording sheet (S105). FIG. 3 is a flowchart showing a web print process that is executed by the CPU 10.

Next, a configuration of the communication control unit 27 will be described in detail.

The communication control unit 27 of the embodiment is connected to the Internet as a WAN (wide area network) and a LAN (local area network), and functions as a communication means capable of bidirectional communication with each terminal in those networks.

The communication control unit 27 is equipped with a WAN-side connection port 41 and a LAN-side connection port 42. A LAN cable for connection to the Internet is connected to the WAN-side connection port 41. On the other hand, a hub 7 or the like is connected to the LAN-side connection port 42. PCs 4 and 5, etc., as LAN terminals are connected to the hub 7 to constitute the LAN.

The communication control unit 27 of the digital composite machine 1 is equipped with a gateway unit 44 which connects the LAN terminals to the Internet in a bi-directional communication enable manner.

The gateway unit 44, which functions as a server called "proxy server", relays a communication between a LAN terminal in the LAN and a terminal (web server 6 or the like) in the Internet to thereby allow the LAN terminal to access the Internet. For example, the gateway unit 44 substitutionally receives content data such as an HTML document provided by the web server 6, image data or the like to which the HTML document is linked in response to a request from a LAN terminal, and supplies (i.e., transfers) the content data to the request source LAN terminal.

The communication control unit 27 of the embodiment is also equipped with a wireless processing unit 46 that is connected to the gateway unit 44. The wireless processing unit 46, which is to conduct a wireless communication with a wireless communication terminal in the LAN, allows a wireless communication terminal in the LAN to access the gateway unit 44 of the digital composite machine 1 by a wireless connection method according to the Bluetooth standard (a standard for short-distance wireless communication) or the IrDA standard (a standard for infrared communication).

That is, the communication control unit 27 of the digital composite machine 1 can not only communicate with the LAN terminals such as the PCs 4 and 5 by the wired connection method but also communicate with, by the wireless communication method, personal digital assistants (PDAs 8 and 9), etc., in the LAN that have a wireless communication function. A personal digital assistant (PDA 8 or 9) in the LAN can conduct a bidirectional communication with either of a terminal (web server 6 or the like) in the Internet and a terminal in the LAN via the wireless processing unit 46 and the gateway unit 44.

Figure 4:
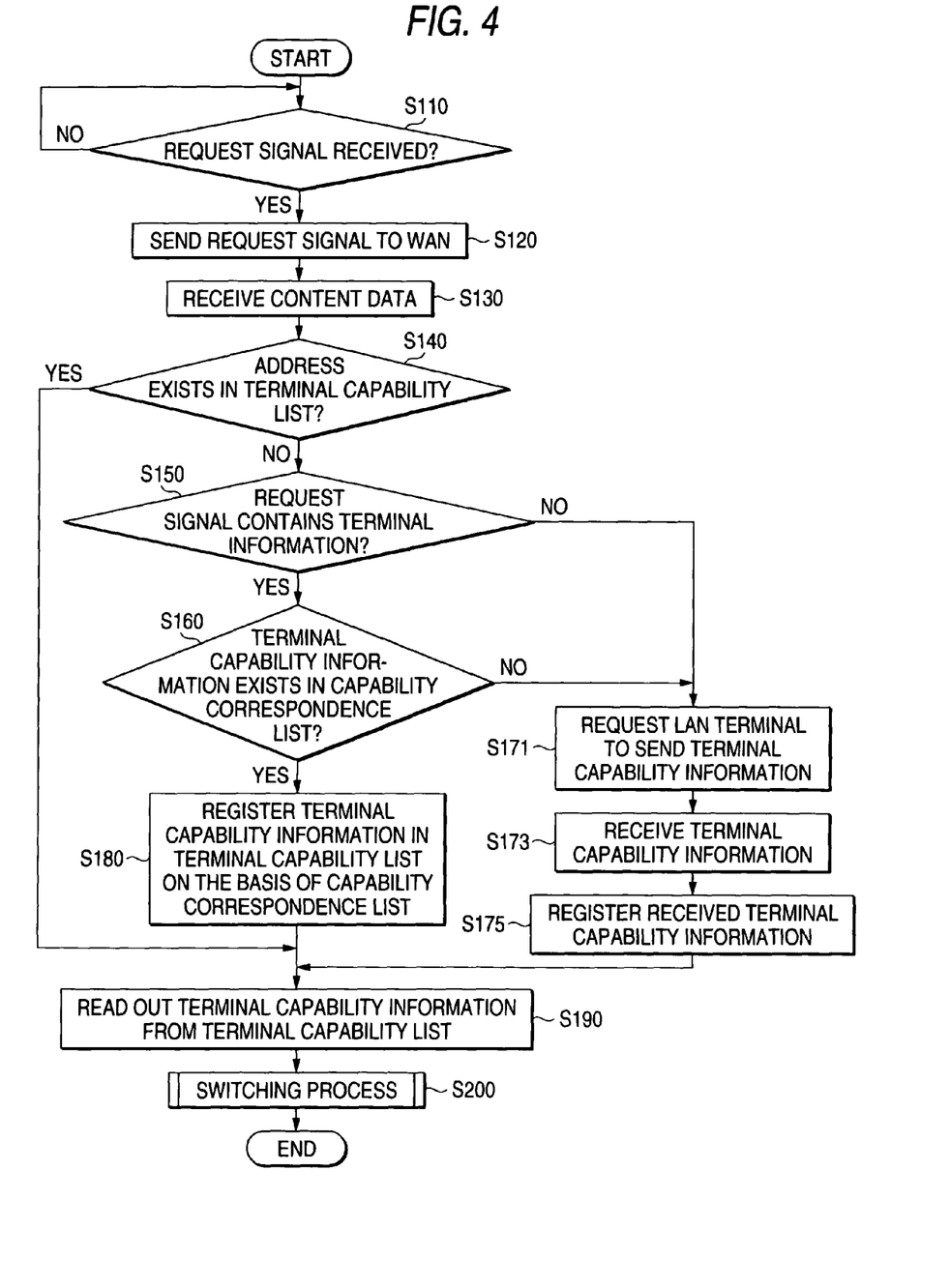
FIG. 4 shows a flowchart of a main routine that is repeatedly executed by a gateway unit.

Subsequently, the operation of the gateway unit 44 provided in the communication control unit 27 of the embodiment will be described. FIG. 4 is a flowchart of a main routine that is always executed repeatedly by the gateway unit 44.

When receiving, from a LAN terminal, as a communication signal according to HTTP (hypertext transfer protocol), a request signal that requests sending of content data from the web server 6 that is provided in the Internet (S110), the gateway unit 44 sends the request signal to the web server 6 in the Internet on behalf of the LAN terminal (S120).

When receiving the request signal according to HTTP externally, the web server 6 determines, on the basis of the contents of the request signal, content data corresponding to the request signal from a content data group that can be provided by the web server. The web server 6 sends, via the Internet, as a response signal to the request signal, the determined content data to the gateway unit 44 that has substitutionally sent the request signal. Signals that are exchanged between the gateway unit 44 and the web server 6 are of a known type according to HTTP and hence are not described here in detail.

When receiving the content data from the web server 6 (S130), the gateway unit 44 determines a LAN terminal that has sent the request signal corresponding to the content data, and judges whether address information (in the embodiment, an IP address) of the determined LAN terminal exists in a terminal capability list of LAN terminals which is stored in a database 47 incorporated in the web server (S140).

Figure 5A:
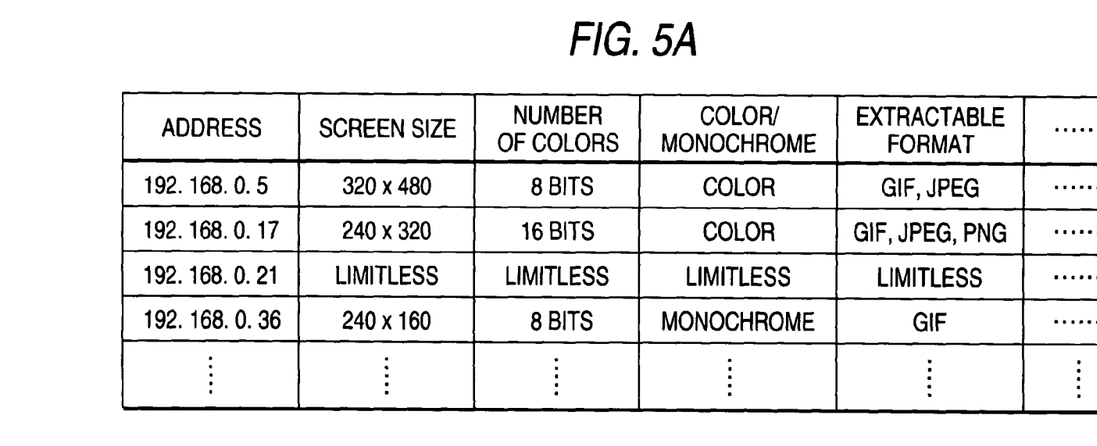
FIGS. 5A and 5B illustrate a terminal capability list and a capability correspondence list, which are stored in a database, respectively.

A terminal capability list shown in FIG. 5A is stored in the database 47 incorporated in the gateway unit 44. As seen from the figure, terminal capability information relating to capabilities of a LAN terminal such as a screen size of the display unit of the terminal, the number of colors (or the number of gradations) which can be displayed by the display unit, presence/absence of a color display capability, extractable image formats, etc., is stored in the database 47 for each LAN terminal as part of the terminal capability list so as to be correlated with address information of the LAN terminal. Therefore, by referring to its address information, the digital composite terminal 1 according to the embodiment can judge whether terminal capability information of the request signal transmission source is registered in the terminal capability list.

If judging at step S140 that address information of the LAN terminal that has sent the request signal for web server does not exist in the terminal capability list (i.e., terminal capability information of the LAN terminal that has sent the request signal for web server is not registered in the terminal capability list; "no" at step S140), the gateway unit 44 proceeds to step S150. At step S150, the gateway unit 44 judges whether the request signal that was sent to the web server 6 in requesting the content data contains terminal information relating to a kind of terminal.

As is well known, there may be a case that allows a terminal to properly display an HTML document, the terminal sends, in accessing the web server 6, terminal information (e.g., a type of browser, a type number of the terminal, etc.,) for identification of a type of terminal in such a manner that the terminal information is contained in a request signal.

If judging at step S150 that such terminal information is contained in the request signal ("yes" at step S150), the gateway unit 44 judges, on the basis of the terminal information, whether terminal capability information corresponding to the LAN terminal that has sent the request signal for web server can be acquired from a capability correspondence list that is stored in the database 47 (S160).

Figure 5B:
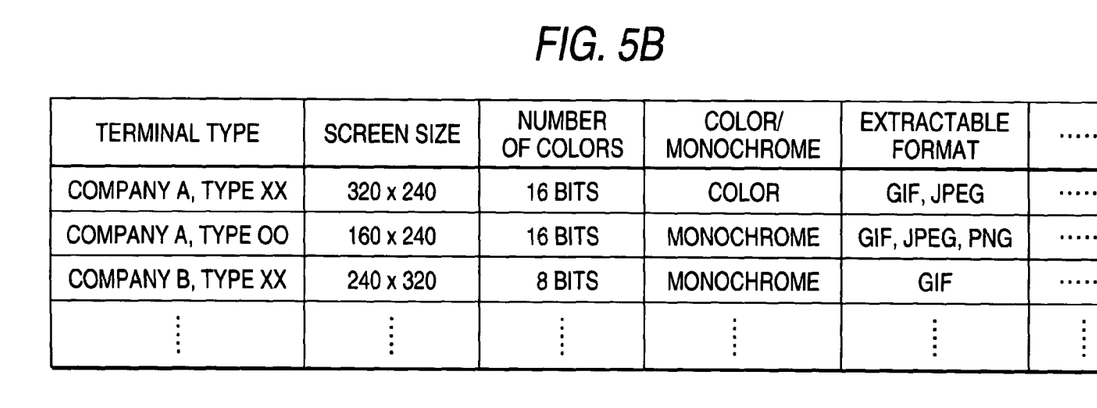

FIG. 5B illustrates an example of the capability correspondence list. Terminal capability information such as a screen size of the display unit of a terminal, the number of colors (or the number of gradations) that can be displayed by the display unit, presence/absence of a color display capability, extractable image formats, etc., is stored in the database 47 for each terminal of a maker as part of the capability correspondence list.

If judging, at step S160, on the basis of the terminal information, that terminal capability information corresponding to the LAN terminal that has sent the request signal for web server can be acquired from the capability correspondence list ("yes" at step S160), the gateway unit 44 reads out terminal capability information corresponding to the LAN terminal from the capability correspondence list and registers the address information and the read-out terminal capability information of the LAN terminal in the terminal capability list (S180). Then, the gateway unit 44 proceeds to step S190.

On the other hand, if judging that no terminal information is contained in the request signal ("no" at step S150) or no terminal capability information corresponding to the LAN terminal that has sent the request signal for web server can be acquired from the capability correspondence list ("no" at step S160), the gateway unit 44 proceeds to step S171. The gateway unit 44 requests the LAN terminal that has sent the request signal for web server to send terminal capability information (S171). In the embodiment, each LAN terminal is configured to send its own terminal capability information upon receiving a terminal capability information request signal from the gateway unit 44.

When receiving terminal capability information as a response signal from the LAN terminal as the terminal capability information request destination (S173), the gateway unit 44 registers the received terminal capability information in the terminal capability list of the database 47 in such a manner that it is correlated with the address information of the LAN terminal (S175). Then, the gateway unit 44 proceeds to step S190.

Figure 6:
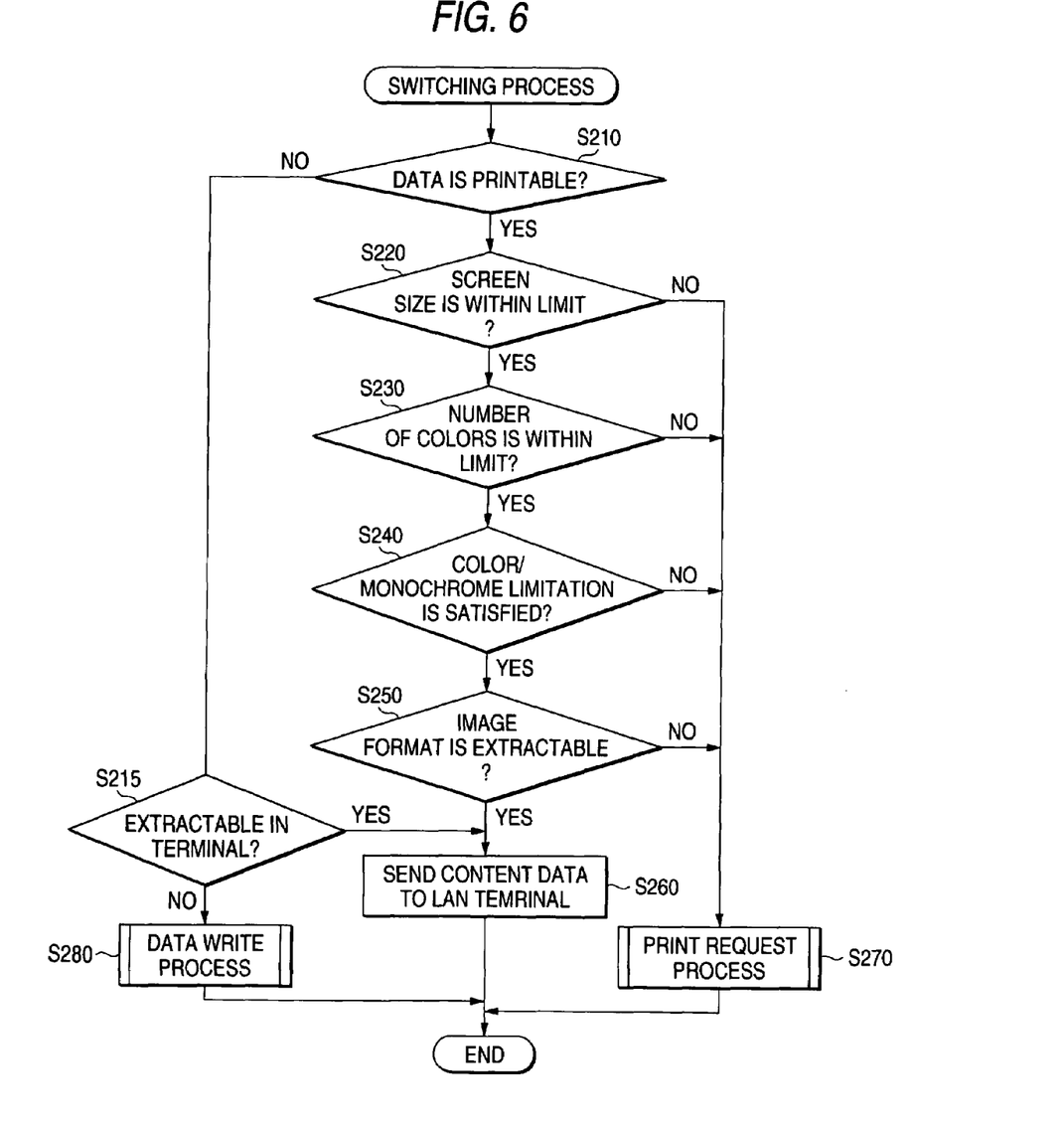
FIG. 6 shows a flowchart of a switching process that is executed by the gateway unit.

At step S190, the gateway unit 44 reads out the terminal capability information of the LAN terminal that has sent the request signal for web server from the terminal ability list. At step S200, the gateway unit 44 executes a switching process. FIG. 6 shows a flowchart of the switching process that is executed by the gateway unit 44 in the main routine.

In the switching process, the gateway unit 44 first judges whether the received content data is printable data (S210). If judging that the received content data is not printable data ("no" at step S210), the gateway unit 44 proceeds to step S215. On the other hand, if judging that the received content data is printable data ("yes" at step S210), the gateway unit 44 proceeds to step S220.

In this embodiment, text data such as an HTML document and image data are judged printable data. Conversely, musical data of the MP3 format or the WAV format and moving picture data are judged not printable data.

At step S220, the gateway unit 44 judges an image size of image data contained in the content data and further judges, on the basis of the terminal capability information of the LAN terminal that has been read out from the terminal capability list, whether the image size is within the terminal capability (i.e., the screen size of the display unit of the terminal). If the terminal capability of the LAN terminal is "limitless" (see the terminal capability list of FIG. 5A), the gateway unit 44 judges at step S220 that the screen size is within the terminal capability irrespective of the image size.

If judging that the image size is within (i.e., is not beyond) the terminal capability ("yes" at step S220), the gateway unit 44 proceeds to the next step S230. At step S230 the gateway unit 44 judges whether the number of colors (the number of gradations in the case of a monochrome image) is within the terminal capability (i.e., the display unit of the LAN terminal is capable of displaying the image data having a certain color depth).

If judging that the number of colors (or the number of gradations) is within the terminal capability ("yes" at step S230), the gateway unit 44 proceeds to step S240. At step S240, the gateway unit 44 judges whether the content data is color data or monochrome data and further judges, on the basis of a result of the above judgment, whether the content data is within the terminal capability.

If judging that content data is within the display capability of the terminal ("yes" at step S240), the gateway unit 44 proceeds to the next step S250. At step S250, the gateway unit 44 judges whether the format of the image data is extractable in the LAN terminal. If judging that the format of the image data is extractable in the LAN terminal ("yes" at step S250), the gateway unit 44 judges that the content data is data that is suitable for the capabilities of the LAN terminal that has sent the request signal for web server and sends the content data to the LAN terminal (S260). The gateway unit 44 thereafter finishes the execution of the switching process.

Figure 7:
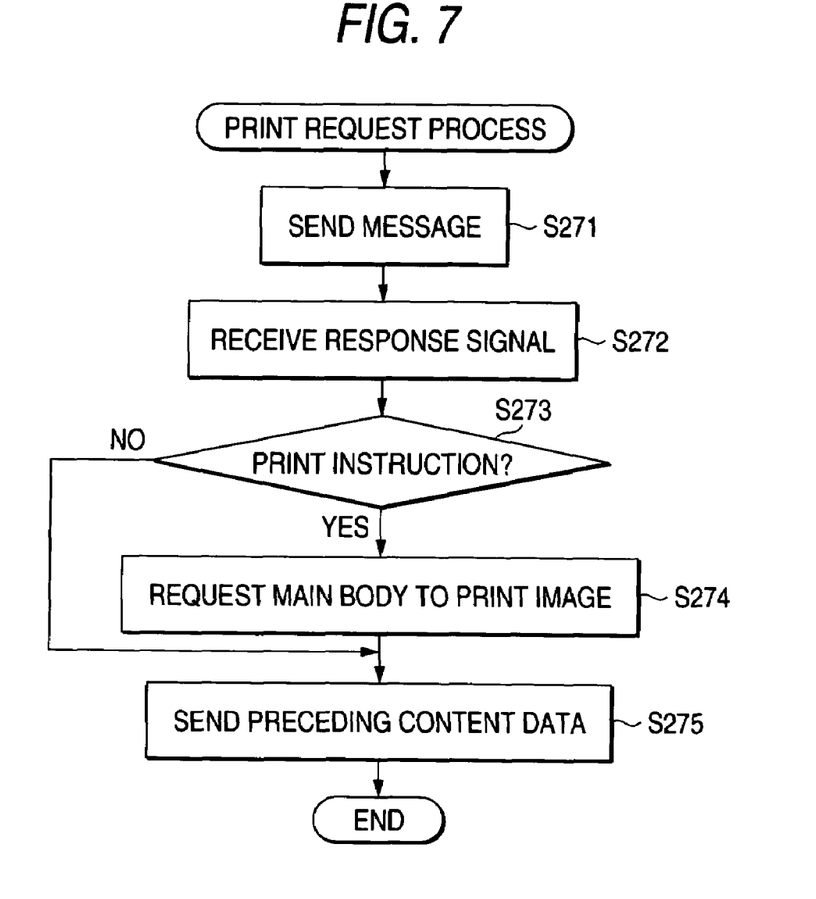
FIG. 7 shows a flowchart of a print request process that is executed by the gateway unit.

On the other hand, if the gateway unit 44 produces a judgment result "no" at one of steps S220 to S250 on the basis of the terminal capability information of the LAN terminal that was read out from the terminal capability list, the gateway unit 44 judges that the content data is data that is not suitable for the capabilities of the LAN terminal that has sent the request signal for web server and proceeds to step S270. At step S270, the gateway unit 44 executes a print request process. FIG. 7 shows a flowchart of the print request process.

In the print request process, the gateway unit 44 first sends, to the LAN terminal that has sent the request signal for web server, a message inquiring whether an image based on the content data should be printed (S271).

Figure 8:
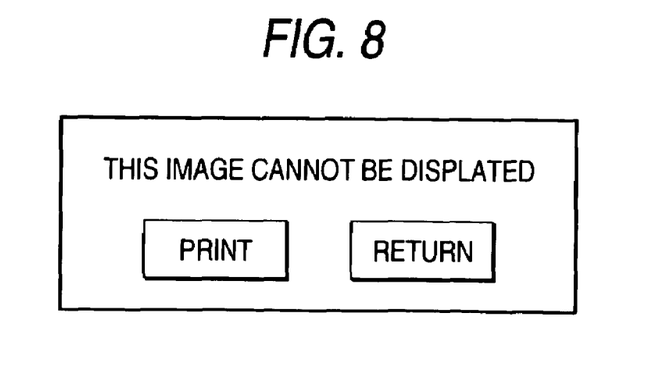
FIG. 8 illustrates an example of a message that the gateway unit causes a LAN terminal to display.

As a result of the transmission of this message, an inquiry message is displayed in the LAN terminal as shown in FIG. 8, for example. FIG. 8 illustrates a manner of display of a message inquiring whether an image based on the content data should be printed.

If judging that the user has made a selection as to whether to print an image by manipulating the LAN terminal on the basis of the contents of the message, the LAN terminal sends a print instruction signal or a print prohibition signal to the gateway unit 44 via the LAN on the basis of the selection information.

When receiving, as a response signal to the message, the print instruction signal or print prohibition signal from the LAN terminal (S272), the gateway unit 44 judges whether the response signal is a print instruction signal or a print prohibition signal (S273). If judging that the response signal is a print instruction signal ("yes" at step S273), the gateway unit 44 sends a print request signal to the CPU 10 of an apparatus main body. Further, the gateway unit 44 inputs the content data to the recording unit 23 and cooperates with the CPU 10 to cause the recording unit 23 to form an image based on the content data (S274). As shown in FIG. 3, when receiving the print request signal, the CPU 10 of the apparatus main body executes a print process to thereby cause the recording unit 23 to form an image based on the content data on a recording sheet.

Then, the gateway unit 44 again sends, to the LAN terminal, an HTML document as content data that was received from the web server 6 and sent to the LAN terminal immediately before the content data as the print subject was received (S275). Then, the gateway unit 44 finishes the print request process and the switching process.

On the other hand, if judging at step S210 that the content data is not printable data, the gateway unit 44 proceeds to step S215. At step S215, the gateway unit 44 judges, on the basis of the terminal capability information of the LAN terminal that was read out from the terminal capability list, whether the LAN terminal that has sent the request signal for web server can extract and process the content data (e.g., whether the content data is reproducible (in the case of musical data)).

Figure 9:
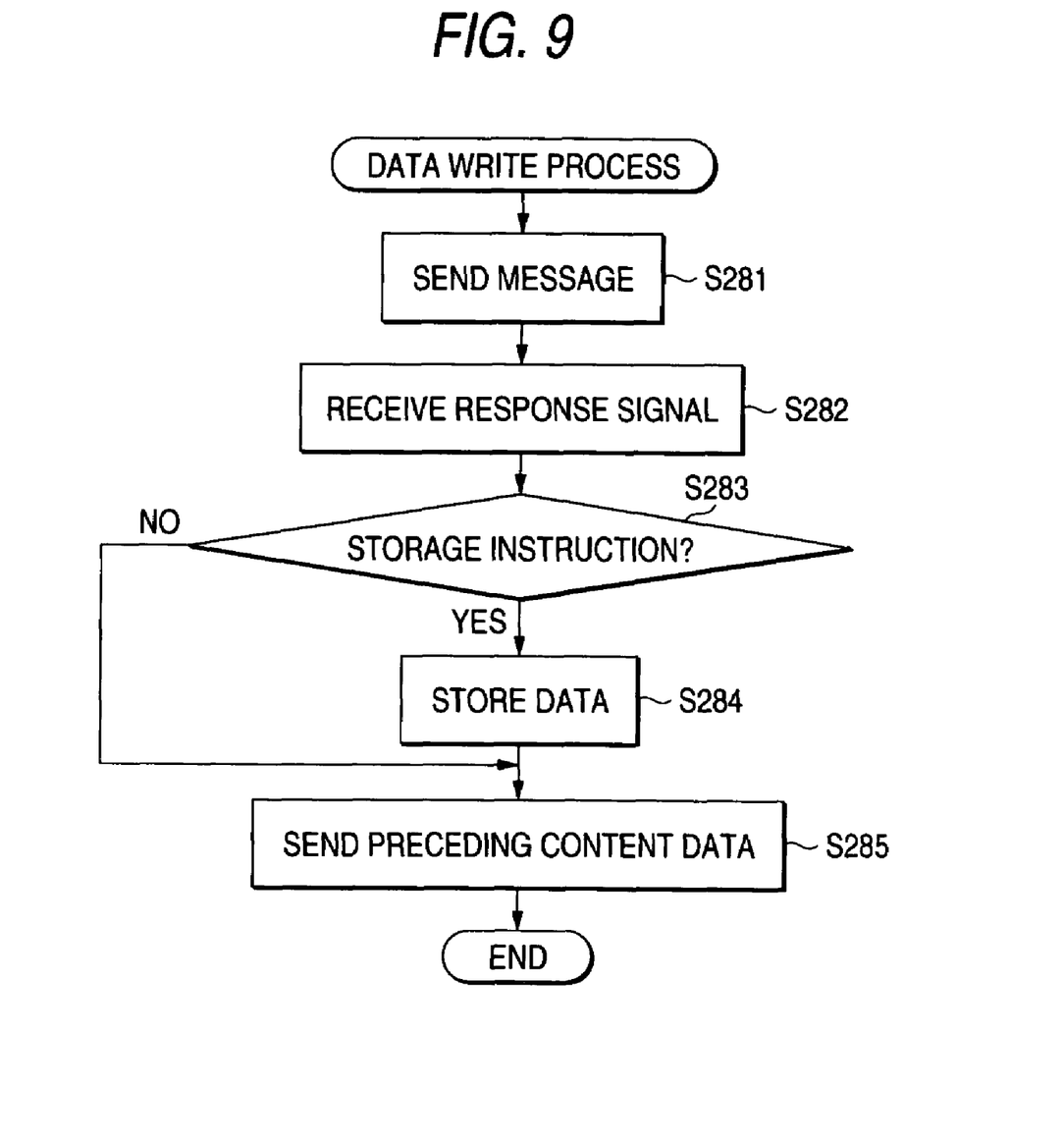
FIG. 9 shows a flowchart of a data write process that is executed by the gateway unit.

If judging that the LAN terminal can extract the content data ("yes" at step S215), the gateway unit 44 judges that the content data is data that is suitable for the capabilities of the LAN terminal that has sent the request signal for web server and proceeds to step S260. At step S260, the gateway unit 44 transfers the content data to the LAN terminal that has sent the request signal for web server. On the other hand, if judging that the LAN terminal cannot extract the content data ("no" at step S215), the gateway unit 44 judges that the content data is data that is not suitable for the capabilities of the LAN terminal that has sent the request signal for web server and executes a data write process (S280). FIG. 9 shows a flowchart of the data write process that is executed by the gateway unit 44.

In the data write process, the gateway unit 44 first sends, to the LAN terminal that has sent the request signal for web server, a message inquiring whether to store the content data (S281).

As a result of the transmission of this message, an inquiring message is displayed in the LAN terminal. If judging that the user has made a selection as to whether to store the content data by manipulating the LAN terminal on the basis of the contents of the message, the LAN terminal sends a storage instruction signal or a storage prohibition signal to the gateway unit 44 via the LAN on the basis of the selection information.

When receiving the storage instruction signal or storage prohibition signal as a response signal from the LAN terminal (S282), the gateway unit 44 judges whether the response signal is a storage instruction signal (S283). If judging that the response signal is a storage instruction signal ("yes" at S283), the gateway unit 44 proceeds to step S284. At step S284, the gateway unit 44 writes the content data to (stores the data in) a data storage unit 49 and proceeds to step S285. A data storage recording medium such as a hard disk drive, a flexible disk, or a memory card is attached to the data storage unit 49 of the embodiment.

On the other hand, if judging that the response signal is not a storage instruction signal ("no" at S283), the gateway unit 44 proceeds to step S285. At step S285, the gateway unit 44 again sends, to the LAN terminal, an HTML document as content data that was received from the web server 6 and sent to the LAN terminal immediately before the current content data was received. Then, the gateway unit 44 finishes the data write process and the switching process.

The embodiment of the invention has been described above. In the digital composite machine 1 according to the embodiment, in a switching process, the gateway unit 44 judges, on the basis of terminal capability information that has been read out from the terminal capability list, whether content data that has been received from the web server 6 is data that is suitable for the capabilities of a LAN terminal that has sent the request signal for web server (S215, S220, S230, S240, and S250). If judging that the content data is data that is suitable for the capabilities of a LAN terminal ("yes" at step S215 or S250), the gateway unit 44 sends the content data to the LAN terminal that has sent the request signal for web server (S260). On the other hand, if judging that the content data is data that is not suitable for the capabilities of a LAN terminal ("no" at step S215, S220, S230, S240, or S250), the gateway unit 44 executes a print request process (S270) or a data write process (S280) depending on the type of the data. In the print request process, the gateway unit 44 causes the recording unit 23 to form an image based on the content data in accordance with a print instruction signal that is sent from the LAN terminal.

Therefore, according to the digital composite machine 1, if content data that is supplied from the web server 6 is data that is not suitable for the capabilities of a LAN terminal, the content data can be printed on a recording sheet and the printed medium can be supplied to the user. As a result, the user of the digital composite machine 1 does not feel unsatisfied because data that is not suitable for capabilities of a LAN terminal can be handled.

In the print request process, the gateway unit 44 sends the LAN terminal a message inquiring whether to print an image based on the received content data (S271) and determines, on the basis of a response signal to the message, whether to print an image based on the content data (S273 and S274). This makes it possible to form, in response to an instruction from the user, an image of content data that is not transferred to the LAN terminal.

Therefore, the digital composite machine 1 can prevent content data that is not suitable for the capabilities of a LAN terminal from being printed automatically regardless of a user's intention, and hence can prevent the user from feeling unsatisfied with formation of an image that is performed contrary to his or her intention.

Further, in the digital composite machine 1, the gateway unit 44 judges whether content data is data that is suitable for the capabilities of a LAN terminal that has sent the request signal for web server on the basis of terminal capability information of the LAN terminal that is stored in the database 47. This makes it possible to properly judge whether content data is suitable for the capabilities of a LAN terminal even in the case where plural kinds of LAN terminals such as the PCs 4 and 5 and the PDAs 8 and 9 exist in mixture in the LAN.

If judging that terminal capability information of the LAN terminal that has sent the request signal for web server is not registered in the database 47 ("no" at step S140), the gateway unit 44 acquires terminal capability information from the LAN terminal that has sent the request signal for web server (S173) and registers that information in the database 47 (S175). Therefore, the user need not update the terminal capability list in the database 47 by manually inputting data. That is, according to the embodiment, since the gateway unit 44 updates the database 47 automatically every time a new LAN terminal is connected to the LAN, the database 47 can be managed easily, which is convenient to the user.

In the digital composite machine 1 according to the embodiment, if the content data that is received from the web server 6 is data (e.g., musical data) of such a type as not to be printed properly ("no" at step S210) and not to be suitable for the LAN terminal ("no" at step S215), the gateway unit 44 stores the data in the data storage unit 49. That is, content data that is not suitable for a LAN terminal and cannot be printed can be stored temporarily in the digital composite machine 1. Therefore, the digital composite machine 1 according to the embodiment makes it possible to later take out that content data and cause another LAN terminal to process the data.

The substitutional sending/receiving unit of the image forming apparatus according to the invention is implemented as steps S110 to S130 that are executed by the gateway unit 44. The transfer unit is implemented as step S260 that is executed by the gateway unit 44. The image formation requesting unit is implemented as step S270 that is executed by the gateway unit 44. The data writing unit is implemented as the data write step S280 that is executed by the gateway unit 44.

The switching unit is implemented as the switching process that is executed by the gateway unit 44. The registering unit is implemented as steps S140 to S180 that are executed by the gateway unit 44. Further, the program product of the invention corresponds to programs that correspond to the processes and steps that are executed by a computer of the gateway unit 44.

The image forming apparatus according to the invention is not limited to that of the above embodiment and various modifications are possible.

In the embodiment, the apparatus is configured in such a manner that only content data that cannot be printed are stored in the data storage unit 49. However, for example, the digital composite machine 1 may be modified in the following manner. In the case in which there exists content data that can be printed but is not suitable for the capabilities of a LAN terminal, a message inquiring whether to store the content data is sent to the LAN terminal. Printing or data storage is performed depending on a response signal to the message.

In the embodiment, the apparatus is configured to judge that the content data sent from the web server is suitable for capabilities of the LAN terminal when a plurality of conditions are satisfied ("yes" at steps S220, S230, S240 and S250). The apparatus may be configured to judge that the content data sent from the web server is suitable for capabilities of the LAN terminal when one or some of the conditions are satisfied.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image forming apparatus connectable to a WAN and a LAN and capable of conducting a bidirectional communication with each terminal in the WAN or the LAN, comprising:

an image forming unit configured to form an image based on externally input data on a recording medium;

a substitutional sending/receiving unit configured to send a request signal to a web server in the WAN upon reception of a request signal for web server from a LAN terminal in the LAN, and configured to receive content data sent from the web server as a response signal to the request signal;

a transfer unit configured to send the content data received by the substitutional sending/receiving unit to the LAN terminal that has sent the request signal for web server;

an image formation requesting unit that causes the image forming unit to form an image based on the content data received by the substitutional sending/receiving unit by inputting the content data to the image forming unit; and a switching unit configured to judge whether the content data received by the substitutional sending/receiving unit is suitable for capabilities of the LAN terminal, configured to cause the transfer unit to operate when judging that the content data is suitable for the capabilities of the LAN terminal, and configured to cause the image formation requesting unit to operate when judging that the content data is not suitable for the capabilities of the LAN terminal, wherein the switching unit directly causes the image formation requesting unit to operate by sending operating instructions to the image formation requesting unit, and the image formation requesting unit, which is configured to receive the operating instructions from the switching unit, causes based on the operating instructions, the image formation unit to form the image.

2. The image forming apparatus according to claim 1, wherein the image formation requesting unit sends the LAN terminal a message inquiring whether to cause the image forming unit to form an image based on the content data received by the substitutional sending/receiving unit, and inputs the content data received by the substitutional sending/receiving unit to the image forming unit when receiving an image formation instruction signal from the LAN terminal as a response to the message.

3. The image forming apparatus according to claim 1, further comprising a database for storing information relating to capabilities of each LAN terminal in the LAN, wherein the switching unit judges whether the content data received by the substitutional sending/receiving unit is suitable for the capabilities of the LAN terminal that has sent the request signal for web server on the basis of the information relating to capabilities of each LAN terminal stored in the database.

4. The image forming apparatus according to claim 3, further comprising a registering unit configured to judge whether information relating to the capabilities of the LAN terminal that has sent the request signal for web server is registered in the database, and configured to acquire information relating to the capabilities of the LAN terminal from the LAN terminal and register the information in the database when judging that the information is not registered in the database.

5. The image forming apparatus according to claim 1, further comprising a data writing unit for writing the content data received by the substitutional sending/receiving unit to a recording medium for data storage, wherein the switching unit selectively causes the image formation requesting unit or the data writing unit to operate depending on a type of the content data when judging that the content data is not suitable for the capabilities of the LAN terminal that has sent the request signal for web server.

6. The image forming apparatus according to claim 1, wherein the image forming unit is configured to print an image based on externally input data on a recording sheet.

7. The image forming apparatus according to claim 1, wherein the switching unit judges that the content data received by the substitutional sending/receiving unit is suitable for capabilities of the LAN terminal when an image size of image data contained in the content data is within a screen size of a display unit of the LAN terminal.

8. The image forming apparatus according to claim 1, wherein the switching unit judges that the content data received by the substitutional sending/receiving unit is suitable for capabilities of the LAN terminal when a display unit of the LAN terminal is capable of displaying image data contained in the content data and having a certain color depth.

9. The image forming apparatus according to claim 1, wherein the switching unit judges that the content data received by the substitutional sending/receiving unit is suitable for capabilities of the LAN terminal when a display unit of the LAN terminal is capable of displaying image data that is color data or monochrome data and is contained in the content data.

10. The image forming apparatus according to claim 1, wherein the switching unit judges that the content data received by the substitutional sending/receiving unit is suitable for capabilities of the LAN terminal when a format of image data contained in the content data is extractable in the LAN terminal.

11. An image forming apparatus connectable to a WAN and a LAN and capable of conducting a bidirectional communication with each terminal in the WAN or the LAN, comprising:

an image forming unit configured to form an image based on externally input data on a recording medium; and a communication control unit including a gateway unit and a wireless processing unit, wherein the gateway unit comprises:

a substitutional sending/receiving unit configured to send a request signal to a web server in the WAN upon reception of a request signal for web server from a LAN terminal in the LAN, and configured to receive content data sent from the web server as a response signal to the request signal;

a transfer unit configured to send the content data received by the substitutional sending/receiving unit to the LAN terminal that has sent the request signal for web server;

an image formation requesting unit that causes the image forming unit to form an image based on the content data received by the substitutional sending/receiving unit by inputting the content data to the image forming unit; and a switching unit configured to judge whether the content data received by the substitutional sending/receiving unit is suitable for capabilities of the LAN terminal, configured to cause the transfer unit to operate when judging that the content data is suitable for the capabilities of the LAN terminal, and configured to cause the image formation requesting unit to operate when judging that the content data is not suitable for the capabilities of the LAN terminal, wherein the switching unit directly causes the image formation requesting unit to operate by sending operating instructions to the image formation requesting unit, and the image formation requesting unit, which is configured to receive the operating instructions from the switching unit, causes based on the operating instructions, the image formation unit to form the image.

12. A computer-readable medium storing a program for causing an image forming apparatus that is connectable to a WAN and a LAN, capable of conducting a bidirectional communication with each terminal in the WAN or the LAN and including an image forming unit configured to form an image based on externally input data on a recording medium to execute procedures, comprising:

a substitutional sending unit that sends a request signal to a web server in the WAN upon reception of a request signal for web server from a LAN terminal in the LAN;

a substitutional receiving unit that receives content data sent from the web server as a response signal to the request signal;

a switching unit that judges whether the content data received by the substitutional receiving unit is suitable for capabilities of the LAN terminal:

a transferring unit that transfers the content data received by the substitutional receiving unit to the LAN terminal that has sent the request signal for web server when the switching unit judges that the content data is suitable for the capabilities of the LAN terminal; and a requesting unit that requests to form an image based on the content data by inputting the content data to the image forming unit when the switching unit judges that the content data is not suitable for capabilities of the LAN terminal, wherein the switching unit directly causes the requesting unit to operate by sending operating instructions to the requesting unit, and requesting unit, which is configured to receive the operating instructions from the switching unit, causes based on the operating instructions, the image forming unit to form the image.

13. A computer-readable medium storing the program according to claim 12, wherein the requesting unit comprises:

a message sending unit that sends the LAN terminal a message inquiring whether to form an image based on the content data; and an inputting unit that inputs the content data to the image forming unit when an image formation instruction signal is received from the LAN terminal as a response to the message.

14. An image forming apparatus connectable to a WAN and a LAN and capable of conducting a bidirectional communication with each terminal in the WAN or the LAN, comprising:

an image forming unit configured to form an image based on externally input data on a recording medium;

a substitutional sending/receiving unit configured to send a request signal to a web server in the WAN upon reception of a request signal for web server from a LAN terminal in the LAN, and configured to receive content data sent from the web server as a response signal to the request signal;

a transfer unit configured to send the content data received by the substitutional sending/receiving unit to the LAN terminal that has sent the request signal for web server;

a data writing unit configured to write the content data received by the substitutional sending/receiving unit to a recording medium for data storage;

an image formation requesting unit that causes the image forming unit to form an image based on the content data received by the substitutional sending/receiving unit by inputting the content data to the image forming unit; and a switching unit configured to judge whether the content data received by the substitutional sending/receiving unit is suitable for capabilities of the LAN terminal or the image formation unit, configured to cause the transfer unit to operate when judging that the content data is suitable for the capabilities of the LAN terminal, configured to cause the image formation requesting unit to operate when judging that the content data is not suitable for the capabilities of the LAN terminal, and configured to cause the data writing unit to operate when judging that the content data is not suitable for the capabilities of the LAN terminal and the image formation unit, wherein the switching unit directly causes the image formation requesting unit to operate by sending operating instructions to the image formation requesting unit, and the image formation requesting unit, which is configured to receive the operating instructions from the switching unit causes, based on the operating instructions, the image formation unit to form the image.

15. The image forming apparatus according to claim 14, wherein the data writing unit sends the LAN terminal a message inquiring whether to write the content data received by the substitutional sending/receiving unit to the recording medium for data storage, and writes the content data to the recording medium for data storage when receiving an image formation instruction signal from the LAN terminal as a response to the message.

16. The image forming apparatus according to claim 14, further comprising a database for storing information relating to capabilities of each LAN terminal in the LAN, wherein the switching unit judges whether the content data received by the substitutional sending/receiving unit is suitable for the capabilities of the LAN terminal that has sent the request signal for web server on the basis of the information relating to capabilities of each LAN terminal stored in the database.

17. The image forming apparatus according to claim 16, further comprising a registering unit configured to judge whether information relating to the capabilities of the LAN terminal that has sent the request signal for web server is registered in the database, and configured to acquire information relating to the capabilities of the LAN terminal from the LAN terminal and register the information in the database when judging that the information is not registered in the database.

18. An image forming apparatus connectable to a WAN and a LAN and capable of conducting a bidirectional communication with each terminal in the WAN or the LAN, comprising:

an image forming unit configured to form an image based on externally input data on a recording medium;

a substitutional sending/receiving unit configured to send a request signal to a web server in the WAN upon reception of a request signal for web server from a LAN terminal in the LAN, and configured to receive content data sent from the web server as a response signal to the request signal;

a transfer unit configured to send the content data received by the substitutional sending/receiving unit to the LAN terminal that has sent the request signal for web server;

an announcing unit configured to announce that the content data received by the substitutional sending/receiving unit is not suitable for the capabilities of the LAN terminal;

an image formation requesting unit that causes the image forming unit to form an image based on the content data received by the substitutional sending/receiving unit by inputting the content data to the image forming unit; and a switching unit configured to judge whether the content data received by the substitutional sending/receiving unit is suitable for capabilities of the LAN terminal, configured to cause the transfer unit to operate when judging that the content data is suitable for the capabilities of the LAN terminal, and configured to cause the announcing unit to operate when judging that the content data is not suitable for the capabilities of the LAN terminal, and configured to cause the image formation requesting unit to operate once a response signal is received in response to the operation of the announcing unit, wherein the switching unit directly causes the image formation requesting unit to operate by sending operating instructions to the image formation requesting unit, and the image formation requesting unit, which is configured to receive the operating instructions from the switching unit causes, based on the operating instructions, the image formation unit to form the image.

* * * * *